US006012188A

United States Patent [19]
Daniels et al.

[11] Patent Number: 6,012,188
[45] Date of Patent: Jan. 11, 2000

[54] SELECTIVELY DEFORMABLE CUSHION

[75] Inventors: Jerry Daniels; Michael E Simonson; Keith E. Grove, all of Ooltewah, Tenn.

[73] Assignee: Ooltewah Manufacturing Company, Ooltewah, Tenn.

[21] Appl. No.: 09/086,316

[22] Filed: May 28, 1998

Related U.S. Application Data

[63] Continuation-in-part of application No. 08/869,373, Jun. 5, 1997, Pat. No. 5,769,488, which is a continuation-in-part of application No. 08/615,615, Mar. 13, 1996, Pat. No. 5,711,573.

[51] Int. Cl.[7] .............................. A47C 7/18; A47C 27/08
[52] U.S. Cl. .................................. 5/654; 5/709; 5/655.9; 297/284.6
[58] Field of Search ............................... 5/709, 653, 654, 5/655.9, 703, 704; 297/284.1, 284.2, 284.6

[56] References Cited

U.S. PATENT DOCUMENTS

| | | | |
|---|---|---|---|
| 1,468,072 | 9/1923 | Ogle | 5/654 X |
| 3,017,642 | 12/1962 | Rosenberg et al. | 5/709 |
| 3,222,694 | 12/1965 | Schick | 5/653 |
| 3,762,766 | 10/1973 | Barecji et al. | 297/284.1 X |
| 3,864,766 | 2/1975 | Prete, Jr. | 5/709 X |
| 4,164,798 | 8/1979 | Weber | 5/653 X |
| 4,371,997 | 2/1983 | Mattson | 5/654 X |
| 4,643,481 | 2/1987 | Saloff et al. | 5/654 X |
| 5,033,133 | 7/1991 | Nissen | 5/653 |
| 5,144,705 | 9/1992 | Rogers | 5/654 |
| 5,369,829 | 12/1994 | Jay | 5/654 |
| 5,634,224 | 6/1997 | Gates | 5/709 |
| 5,671,977 | 9/1997 | Jay et al | 5/654 X |
| 5,711,573 | 1/1998 | Daniels et al. | 297/199 |
| 5,769,488 | 6/1998 | Daniels et al. | 297/199 |

*Primary Examiner*—Michael F. Trettel
*Attorney, Agent, or Firm*—Alan Ruderman; Miller & Martin LLP

[57] ABSTRACT

A seat cushion with a carrying handle has a multi-cellular foam interior structure for holding and releasing air encased within an air impermiable covering and at least one valve member secured to the covering and having a conduit extending through the covering into the foam. The handle may span a front indented portion in which the valve is located so as to span the valve. The cushion may have a second valve permitting air to enter into but not exit from the foam so as to re-inflate the cushion gradually. The first valve permits air to exit the foam when it is open while a compressible force is applied to the foam. Thus, when a person sits on the cushion and opens the valve, air within the cellular structure of the foam is expelled in accordance with the force applied and the foam is shaped to that of the user's compression applying members. The second valve permits re-inflation of the cushion gradually if the user fails to open or actuate the first valve when removed from the cushion for an extended time. Additionally, the cushion may include a gel containing sealed packet positioned within the covering for those instances where the cushion is used on extremely hard surfaces.

16 Claims, 3 Drawing Sheets

SELECTIVELY DEFORMABLE CUSHION

REFERENCE TO RELATED APPLICATIONS

This application is a continuation-in-part of U.S. application Ser. No. 08/869,373 filed Jun. 5, 1997, now U.S. Pat. No. 5,769,488 which is a continuation-in-part of U.S. application Ser. No. 08/615,615, now U.S. Pat. No. 5,711,573.

BACKGROUND OF THE INVENTION

This invention relates to seat cushions which may be selectively deformed to the shape of the user and more particularly to a seat cushion which may be deformed selectively to permit evacuation of the air therein upon forcible compression of the seat and selectively to permit re-entry of the air upon release of the compression force or to prevent the re-entry of the air to maintain the deformed shape.

It is known to provide a seat with a resilient foam cushion encased within a covering. When one sits on such a seat the foam cushioning compresses as air is expelled from the cells of the foam. The air either exits through the cover itself or leaks out of the cover since the covers are porous and in any event are not airtight. Thereafter when the compression is released from the seat by the person getting off, the seat reforms by air re-entering the cells of the foam until the foam looses its resiliency and is no longer effectively compressible, i.e., no longer holds it original uncompressed shape. When such a foam is applied to the rigid base of a seat, such as the seat of a motorcycle, the cushioning effect is minimal after the user has been seated on the seat for some time. The same is true in regard to other seats including those in automobiles, wheel chairs, stadium cushions, office chairs and the like. The air is evacuated and the rigid base beneath it provides the support. Most of such seats, such as the concrete or wooden seats in a sports stadium or arena, are very hard, and thus the cushion placed thereon does not provide must comfort to a seated person. Additionally, there is no adjustability and the pressure points of the body of the seated person on the seat remains stationary and may result in a sore or numb buttocks. One reason for this is that the soft tissues of the buttocks spread and the pelvis or bony prominences settle. Enjoyment of a sports event may be sacrificed due to the loss of comfort resulting from inadequate cushioning.

In our aforesaid U.S. application Ser. No. 08/615,615, now U.S. Pat. No. 5,711,573, a motorcycle seat having a deformable seat cushion is disclosed which comprises a plastic foam material encased within an air tight skin and a valve member located externally of the seat and communicating in sealed relationship through the skin into the foam so that when the valve is open and a compression force is applied to the foam, such as by a person sitting on the seat, air is evacuated and the seat conforms to the shape of the user's buttocks. When the valve is opened and the person disembarks from the seat, air re-enters the cells of the foam to reshape the seat to its original shape.

It was subsequently recognized that when the foam is compressed and is maintained in the compressed shape over a relatively long period of time, the foam loses its "memory," that is, it loses its ability to return to its initial state, and eventually will not return to its original uncompressed configuration. To some extent, this defeats the adjustability feature of the selectively deformable seat. Thus in our co-pending U.S. application Ser. No. 08,869,373, we disclosed a motorcycle seat having a foam cushion which permits air to be evacuated from and returned into the cells of the foam selectively and additionally provides a means for automatically permitting air to re-enter the seat after the rider has disembarked from the seat.

In that application the disclosure related to a seat for a motorcycle having a first valve permitting air to be evacuated from and returned to the interior of the seat selectively to vary the pressure points on the body of the cyclist and a second valve permitting air to enter into the interior of the seat when the first valve is closed and no one is on the seat, but which prevents air from exhausting from the interior of the seat.

In order to utilize the concepts of our aforesaid patent and patent application to mobile stadium seat cushions a number of modifications have been found necessary. For example, stadium seats are notoriously narrow, e.g., in the order of approximately 14 inches and spectators are closely spaced. Thus, it is impracticable to place the valve actuating structure on the side as in the motorcycle seat. Additionally, since certain stadium seats are concrete, and since the cushion cannot be too huge or heavy, since it is intended to be carried to and from the stadium, variations in the cushions had to be considered for use under these circumstances.

SUMMARY OF THE INVENTION

Consequently, it is a primary object of the present invention to provide a comfortable mobile seat cushion for use on stadium and arena seats.

It is another object of the present invention to provide a mobile seat cushion having a cellular foam material enclosed within an airtight covering and a valve member located externally of the covering and communicating in sealed relationship through the covering into the foam, the cushion having a carrying handle and having the valve member disposed in an unobtrusive location.

It is a further object of the present invention to provide a mobile seat cushion having a cellular foam material enclosed within an airtight covering and a valve member located externally of the covering and communicating in sealed relationship through the covering into the foam, a second valve member to permit air to enter into the interior of the cushion but preventing air from exhausting from the interior of the cushion, the cushion having a carrying handle and having the first valve member disposed in an unobtrusive location.

It is a still further object of the present invention to provide a mobile seat cushion having a cellular foam material enclosed within an airtight covering and a valve member located externally of the covering and communicating in sealed relationship through the covering into the foam, a pliant gel material within a sealed packet disposed on the foam within the covering for cushion required to provide additional support, the cushion having a carrying handle and having the valve member disposed in an unobtrusive location.

Accordingly, the present invention provides a seat cushion with a carrying handle, the cushion having a multicellular foam interior structure for holding and releasing air encased within an air impermeable covering, and a valve member secured to and disposed externally of the covering and having a conduit extending in substantially sealed relationship through the covering into the foam.

Thus, the air within the foam may exit the foam when the valve is open while a compressible force is applied to the foam. When a person sits on the cushion and opens the valve, air within the cells of the foam is expelled in accordance with the force applied by the contacting members of the person. The cushion in the direction of its thickness shapes itself to the shape of the user's buttocks in the initial seating position, but the air within the cushion may be redistributed as the seated person changes position with a valve closed. This permits the pressure points of the user on the cushion to be distributed evenly.

Additionally, air may be either further exhausted when the user changes positions and opens the valve, or air may re-enter the cells of the foam when the valve is open and the force due to the weight of the user is released from the foam. Thus, the air may be selectively exhausted and retained by the cells of the foam.

Preferably the seat cushion may have a configuration such that the valve is located in the vicinity of the carrying handle and yet unobtrusive both to the carrying function of the seat and the use of the seat. To this end the cushion may have a side surface contoured with an indentation formed between a pair of cheeks or lobes, the handle extending from one lobe to the other, and the valve being disposed in the indentation. Additionally, as disclosed in our aforesaid co-pending patent application, a second valve member may permit air to enter into but not exit from the foam. This valve is provided to re-inflate the cushion gradually in the event that the user fails to open or actuate the first valve after unseating from the cushion for an extended time, as when carrying the cushion. Thus, the second valve acts to permit air to enter into the foam to prevent loss of "memory" of the foam over time.

Moreover, a cushion of the present invention may include a pliant gel pack disposed on or below the foam within the sealed covering, the gel pack providing a synergistic addition to the cushion and is useful especially in those situations where the cushion is used on concrete stadium seats. To this end the gel is located within a sealed pack and the pack together with the foam is sealed within the covering.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
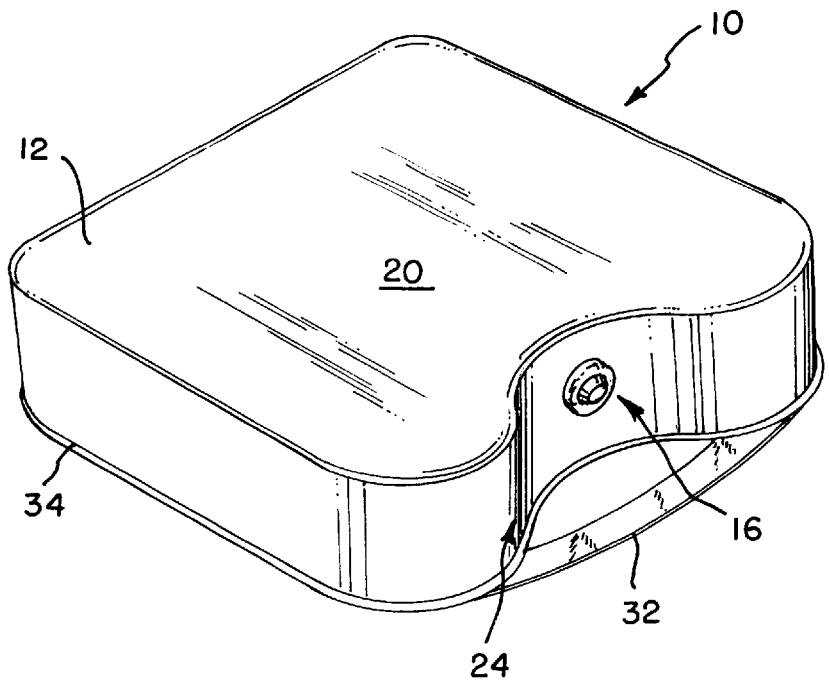
FIG. 1 is a front top perspective view illustrating a stadium cushion constructed in accordance with the principles of the present invention.

Referring to the drawings, there is illustrated a seat cushion 10 constructed in accordance with the principles of the present invention, the cushion comprising an outer covering 12 formed from an air impermeable material such as polyurethane or cloth-backed vinyl sheeting which encloses an interior cushioning material 14 able to hold and release air. The cushioning material 14 is a multi-cellular foam, preferably a urethane foam, which may be compressed with relative ease. As the foam is compressed, air within the cells is expelled, and when the compression on the foam is released, air re-enters the cells of the foam.

The cushioning material 14 is sealed within the outer covering 12 which is airtight except for at least one valve member 16. The valve member 16 includes a conduit 18, illustrated in FIG. 8, extending through the covering 12 in sealed relationship therewith and extends into the foam cushioning 14.

Figure 2:
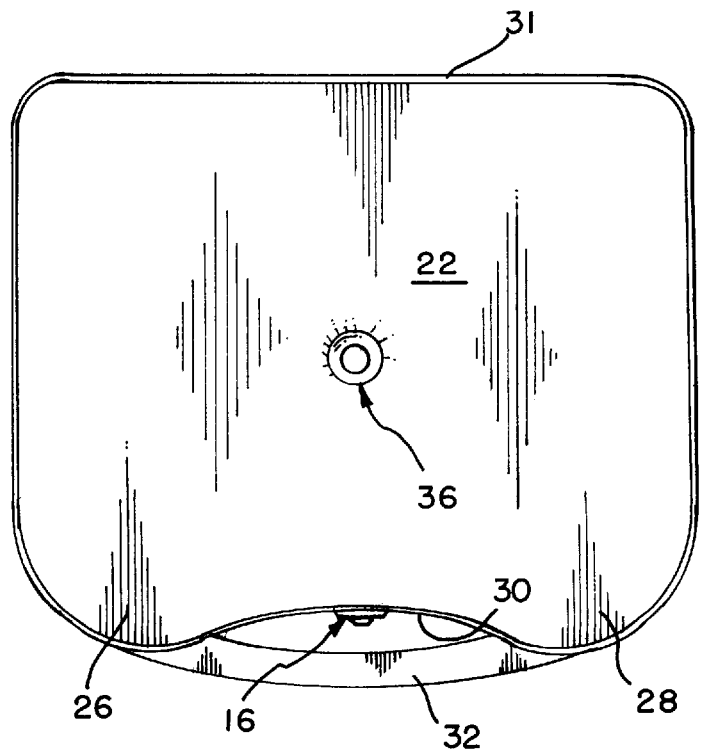
FIG. 2 is a bottom view of the cushion illustrated in FIG. 1.
Figure 3:
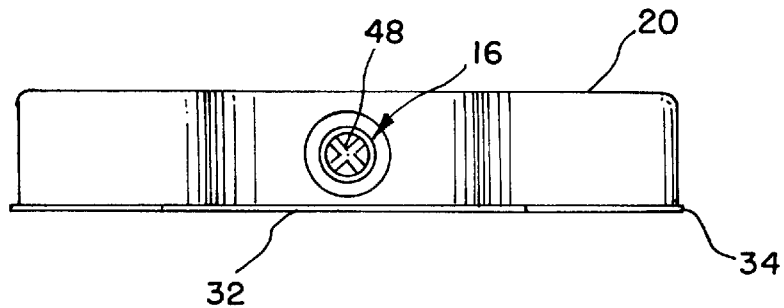
FIG. 3 is a front elevational view of the cushion.
Figure 4:
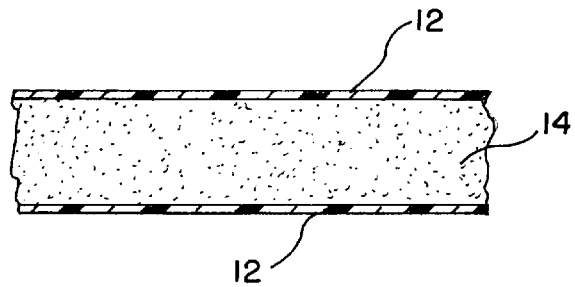
FIG. 4 is a cross sectional view taken through a cushion incorporating one form of the invention.

As illustrated in FIGS. 1 and 2, the cushion has a somewhat square configuration except that between the upper and lower surfaces 20, 22 respectively, the frontal portion 24 may have a pair of laterally spaced apart curvilinear sections 26, 28 with an indented section 30 therebetween, that is the section 30 is closer to the rear face 31 than the lateral sections. Thus, the vertical front surface 24 has unique curvilinear configuration with lateral cheeks or lobes 26, 28. However, it is the idented section 30 that is significant and the lateral sections may have other configurations. Extending between the lobes 26, 28 and spanning the indented section 30 at the bottom of the cushion is a handle 32 formed from a double thickness of covering material. The handle preferably smoothly merges into a seal 34 formed between the bottom 22 and the sides of the cushion, the sides preferably being unitarily formed with the upper surface. The valve 16 is disposed within the indented section 30 of the vertical frontal surface 24, preferably in the base or portion most indented toward the rear relative to the handle and the most protubing parts of the lobes 26 and 28.

Figure 7:
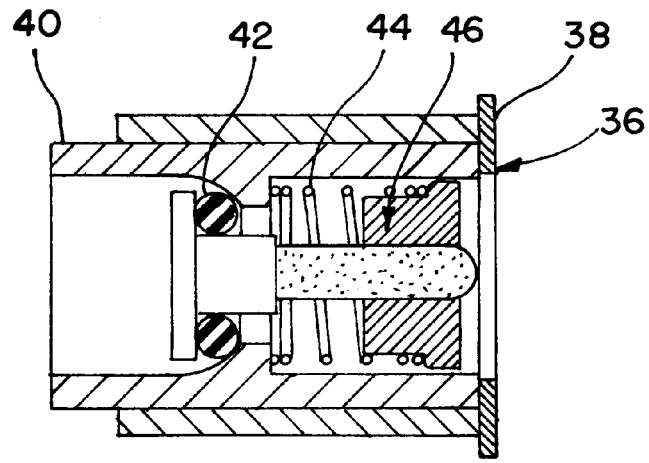
FIG. 7 is a cross sectional view through a bleed-back valve used in the present invention.

A second valve member 36 may be desirable for reasons explained in our aforesaid co-pending patent application, i.e., to permit air to re-enter the foam gradually when there is no load on the cushion after an extended period of time. This valve has an outer ring 38 that substantially is disposed on the covering 12 and has a small conduit or outlet portion 40 which extends through the covering 12 in sealed relationship therewith and into the foam 14. The second valve member 36 is a one-way valve wherein air may flow into the foam from the exterior of the cushion, but air cannot flow outwardly through this valve. This valve, as illustrated in FIG. 7, may include an annular of "O" ring 42 that seals the interior of the valve body against flow of air from the interior yet permits air from the space between the exterior of the cushion to bleed past the "O" ring 42 and into the foam when the air has been expelled from the foam by the opening of the first valve 16 and the application of the compression force. A small spring 44 acts to bias a moveable assembly 46 outwardly to provide small resistance to the movement of the "O" ring 42.

Figure 8:
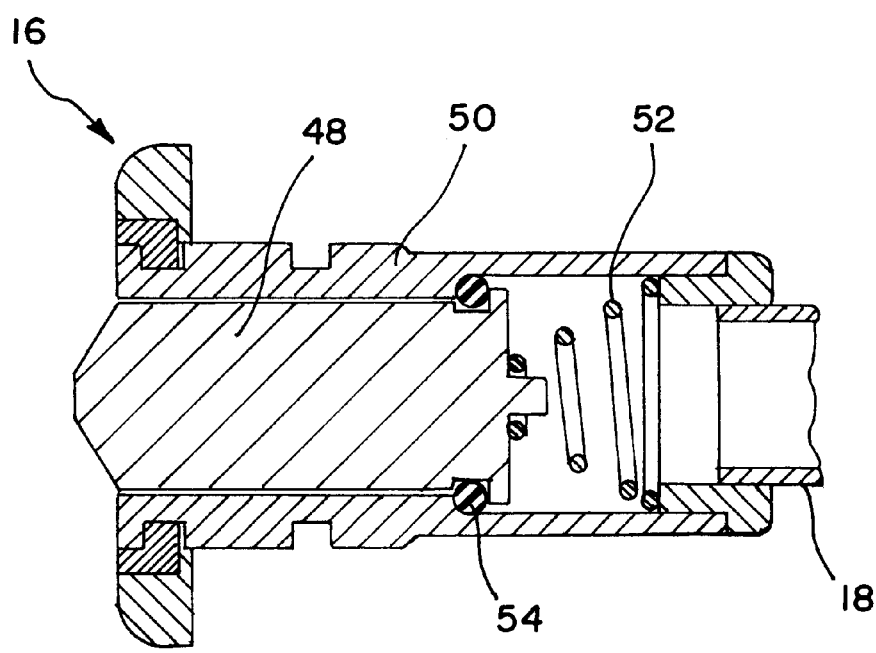
FIG. 8 is a cross sectional view through a manually actuated valve used in the present invention.

The first valve member 16, as illustrated in FIG. 8, includes an actuating piston or plunger member 48 which is urged outwardly from the body 50 of the first valve member 16 by a spring 52 to seal the valve by means of an "O" ring 54 to shut communication between the air outside the cushion and the conduit 18 at the outlet of the valve, and thus the foam. When the plunger 48 is depressed to overcome the urging of the spring, the "O" ring moves with the plunger and opens communication between the conduit 18 and the ambient conditions, and air may exit or enter from between the plunger and the valve body and through the conduit 18 from or into the foam. Although the valves have been described in detail, neither per se form the subject matter of the present invention, but merely exemplify valves that may be utilized in the present invention.

When a person sits on the cushion and depresses the plunger 48 air within the cells of the foam where compressed at the points of engagement by the person's body, is expelled from the foam and the foam re-forms to the shape of the person in accordance with the compression points, for example, the shape of the person's buttocks. The plunger 48 may then be released and the foam will remain in that shape. As the person shifts about without depression of the plunger to let air in or out, the air within the cells is repositioned within the foam since the air cannot escape from the covering but can only be repositioned within the cells as the pressure points of the person shift. Lateral support is thus provided to the person and the soft tissues of the buttocks remain tucked in under the bony prominences and prevents pressure on the bones from increasing with time, i.e., the seat provides resistance against the tendency of the soft tissues spreading aside and keeps some of the tissue tucked in under the pelvis. The pressure points are thus evenly distributed as the user changes position. As noted in the aforesaid patent application, extensive testing bears out the fact that pressures on the buttocks are reduced and capillary closing is substantially reduced.

If the user is forgetful or expects to be back on the cushion shortly and does not depress the plunger 48 after disembarking from the cushion, and if the foam remains in a compressed condition for a period of time, it loses its ability to return to its initial state, i.e., it has a memory loss. The second valve 36 eliminates the need to re-inflate the seat by use of the valve 16 by permitting air to slowly bleed into the seat.

Figure 5:
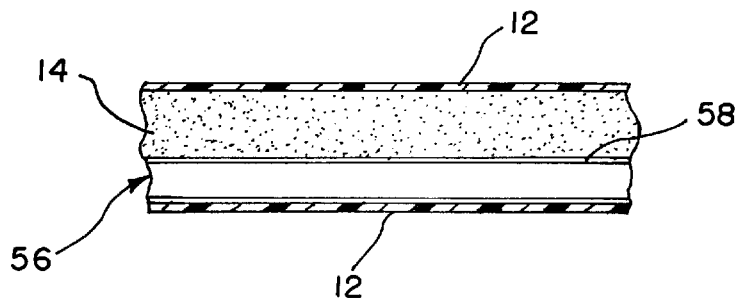
FIG. 5 is a cross sectional view through a cushion incorporating a second form of the invention.
Figure 6:
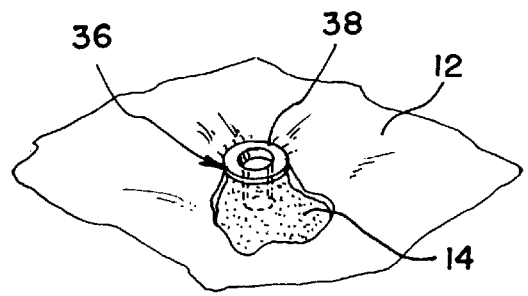
FIG. 6 is a fragmentary bottom plan view through a portion of the cushion illustrated in FIG. 2 with portions thereof broken away.

If the cushion is to be used on concrete seats, such as those found in certain stadiums, it may be desirable to utilize the valve controlled cellular foam construction as aforesaid in combination with a pliant gel pack 56 as illustrated in FIG. 5. This gel pack may comprise a polymer gel or a silica gel sealed within a plastic packet 58, the packet with the gel therein being subsequently sealed within the covering 12. This may provide a substantially thicker cushion and provides greater comfort when sitting on exceptionally hard seats such as concrete seats. As illustrated in FIG. 5, in this case the foam 14 may be disposed above the gel portion and the second valve member 36, if utilized, would be on the top. However it may be more convenient to reverse the order.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A seat cushion for use on a rigid seat comprising: a resilient multi-cellular foam material capable of holding air within the cellular structure, an air impermeable covering disposed about said foam material encasing and sealing said foam material within said covering, said covering and foam having a peripheral configuration between an upper surface on which a person may sit and a lower surface which may be disposed on said rigid seat, said peripheral configuration comprising a rear portion, side portions and a front portion, said front portion having a substantially centrally located indented section disposed closer to said rear portion than adjacent lateral sections of said front portion, a carrying handle extending intermediate said lateral sections and spanning said indented section, and a valve disposed in said indented section having a conduit extending through said covering in sealed relationship therewith and terminating within said foam material, said valve including an operator disposed externally of said covering for opening and closing communication between said conduit and ambient air external of said covering, whereby air selectively may be expelled from said foam material through said conduit when said foam material is compressed by a force on said cushion and deformed and air may re-enter deformed foam material when compression is relieved.

2. A seat cushion as recited in claim 1, including a second valve having an outlet including a portion extending through said covering in sealed relationship therewith and communicating with the foam and an inlet opening outside said covering, said second valve having means for permitting air to bleed from said inlet through said outlet slowly to inflate said foam after air in said foam has been expelled so as to prevent said foam from remaining in a compressed state for an excessive period of time after said compression force is removed.

3. A seat cushion as recited in claim 1, including a gel containing sealed packet positioned on or below said foam within said covering.

4. A seat cushion as recited in claim 3, including a second valve having an outlet including a portion extending through said covering in sealed relationship therewith and communicating with the foam and an inlet opening outside said covering, said second valve having means for permitting air to bleed from said inlet through said outlet slowly to inflate said foam after air in said foam has been expelled so as to prevent said foam from remaining in a compressed state for an excessive period of time after said compression force is removed.

5. A seat cushion as recited in claim 2, wherein said second valve is disposed in said lower surface.

6. A seat cushion as recited in claim 3, wherein said second valve is disposed in said upper surface.

7. A seat cushion for use on a rigid seat comprising: a resilient multi-cellular foam material capable of holding air within the cellular structure, an air impermeable covering disposed about said foam material encasing and sealing said foam material within said covering, a first valve including a conduit extending through said covering in sealed relationship therewith and terminating within said foam material, said valve including an operator disposed externally of said covering for opening and closing communication between said conduit and ambient air external of said cushion, whereby air selectively may be expelled from said foam material through said conduit when said foam material is compressed by a force on said cushion and deformed and air may re-enter deformed foam material when compression is relieved, a second valve having an outlet including a portion extending through said covering in sealed relationship therewith and communicating with the foam and an inlet opening outside said covering, said second valve having means for permitting air to bleed from said inlet through said outlet slowly to inflate said foam after said air in said bladder has been expelled so as to prevent said foam from remaining in a compressed state for an excessive period of time after said compression force is removed, and a carrying handle extending from a first portion of said covering material to a second portion of said covering material.

8. A seat cushion as recited in claim 7, wherein said carrying handle is formed from said covering material and spans the location of said first valve operator.

9. A seat cushion as recited in claim 7, including a gel containing sealed packet positioned on or below said foam within said covering.

10. A seat cushion as recited in claim 7, wherein said second valve is disposed in said lower surface.

11. A seat cushion as recited in claim 7, wherein said second valve is disposed in said upper surface.

12. A seat cushion as recited in claim 8, including a gel containing sealed packet positioned on or below said foam within said covering.

13. A seat cushion as recited in claim 8, wherein said second valve is disposed in said lower surface.

14. A seat cushion as recited in claim 8, wherein said second valve is disposed in said upper surface.

15. A seat cushion for use on a rigid seat comprising: a resilient multi-cellular foam material capable of holding air within the cellular structure, an air impermeable covering disposed about said foam material encasing and sealing said foam material within said covering, a valve including a conduit extending through said covering in sealed relationship therewith and terminating within said foam material, said valve including an operator disposed externally of said covering for opening and closing communication between said conduit and ambient air external of said cushion, whereby air selectively may be expelled from said foam material through said conduit when said foam material is compressed by a force on said cushion and deformed and air may re-enter deformed foam material when compression is relieved, a gel containing sealed packet positioned within said covering, and a carrying handle fastened to said covering spanning said valve operator.

16. A seat cushion as recited in claim 15, wherein said foam material and said covering define front, side and rear surfaces, said front surface having an indented section relative to said rear surface, and said valve being disposed in said indented section.

* * * * *